(12) United States Patent
Ehrhart et al.

(10) Patent No.: US 9,795,080 B2
(45) Date of Patent: Oct. 24, 2017

(54) DISC MOWER CUTTERBAR SHROUD

(75) Inventors: Philip J. Ehrhart, Narvon, PA (US); Edward H. Priepke, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 596 days.

(21) Appl. No.: 13/438,477

(22) Filed: Apr. 3, 2012

(65) Prior Publication Data

US 2013/0255215 A1 Oct. 3, 2013

(51) Int. Cl.
*A01D 67/00* (2006.01)
*A01D 34/81* (2006.01)

(52) U.S. Cl.
CPC .................. *A01D 34/81* (2013.01)

(58) Field of Classification Search
CPC ........ A01D 34/00; A01D 75/30; A01D 57/00; A01D 34/66; A01D 34/64; A01D 34/63; A01D 34/664; A01D 34/81; A01D 43/06; A01D 43/006
USPC .................. 56/320.1, 255, 13.5, 6, 157, 119
See application file for complete search history.

(56) References Cited

U.S. PATENT DOCUMENTS

| 3,412,536 | A | * | 11/1968 | Drummond .................... 56/13.5 |
| 3,673,779 | A | | 7/1972 | Scarnato et al. |
| 4,145,865 | A | * | 3/1979 | Werner ........................... 56/14.4 |
| 4,185,445 | A | * | 1/1980 | van der Lely ....... A01D 43/107 56/13.6 |
| 4,330,982 | A | * | 5/1982 | Vissers .................. A01D 57/30 56/14.5 |
| 4,452,034 | A | | 6/1984 | Neuerburg |
| 4,637,201 | A | * | 1/1987 | Pruitt ..................... A01D 43/10 56/14.5 |
| 5,272,859 | A | * | 12/1993 | Pruitt .................... A01D 34/668 56/15.2 |
| 5,996,323 | A | | 12/1999 | Campbell et al. |
| 6,158,201 | A | * | 12/2000 | Pruitt et al. .......................... 56/6 |
| RE40,604 | E | | 12/2008 | Pruitt et al. |
| RE40,614 | E | * | 1/2009 | Schmitt et al. ..................... 56/6 |
| 7,536,846 | B1 | | 5/2009 | Pruitt et al. |
| 7,661,253 | B2 | * | 2/2010 | Pruitt et al. .................... 56/13.6 |
| 7,669,391 | B2 | | 3/2010 | Eubanks et al. |
| 7,726,108 | B1 | * | 6/2010 | Pruitt et al. .................... 56/14.5 |
| 8,015,784 | B2 | * | 9/2011 | Barnett et al. .................. 56/157 |
| 8,069,640 | B2 | * | 12/2011 | Barnett et al. .................. 56/157 |
| 8,161,719 | B2 | * | 4/2012 | Barnett et al. .................. 56/157 |
| 8,434,290 | B2 | * | 5/2013 | Barnett ................ A01D 34/668 56/157 |
| 2010/0269475 | A1 | * | 10/2010 | Barnett .................. A01D 43/10 56/157 |

* cited by examiner

*Primary Examiner* — Thomas B Will
*Assistant Examiner* — Joan D Misa
(74) *Attorney, Agent, or Firm* — Peter K. Zacharias; Patrick M. Sheldrake

(57) ABSTRACT

A shroud for the rearward periphery of the cutter knives on a rotary disc cutterbar that creates a floor surface slightly above and adjacent to the rotating plane of the knives thereby reducing the tendency for cut crop material to fall into contact with the knives along the rearward periphery of the cutterbar.

17 Claims, 2 Drawing Sheets

DISC MOWER CUTTERBAR SHROUD

BACKGROUND OF THE INVENTION

This invention relates generally to a machine for harvesting crops in a field and, more particularly, to a floor shroud to improve cut crop movement in a disc cutterbar.

When cutting certain crops, especially branched crops like alfalfa, with a rotary disc mower-conditioner, significant re-cutting of the crop often occurs on the rearward side of the cutterbar. Crop material that is cut by the leading edge of the rotary cutter can fall to the trailing side of the rotary cutter rather than moving directly into transfer augers or conditioner apparatus. The crop material is re-cut on the trailing side of the rotary cutter which requires additional power input from the machine, increases fuel consumption, and generally increases crop losses from the field.

Conventional mower-conditioner floor shields typically partially extend from a position below the rearward side of the rotary cutters and rearwardly and upwardly toward the conditioner apparatus. This arrangement allows cut crop material to fall into contact with the cutter knives on the rearward side of the rotary cutter where it is subsequently re-cut. It would be desirable to provide a floor shield that would reduce crop re-cutting to maintain cutterbar performance in all crop conditions.

SUMMARY OF THE INVENTION

Accordingly, the present invention, in any of the embodiments described herein, may provide one or more of the following advantages:

It is an object of the present invention to provide a rotary disc cutterbar guide that reduces crop re-cut in a mower apparatus.

It is a further object of the present invention to provide crop guide shields for a rotary disc cutterbar having a plurality of rotating cutterheads which shroud the rearward portion of the rotating periphery of the knives to prevent previously cut crop material from interacting with the knives on the rearward portion of their rotation.

It is a further object of the present invention to provide guide shields for a rotary disc cutterbar that direct cut crop material from the cutterbar to a rearwardly disposed converging or conditioner apparatus and reduce crop losses.

It is a further object of the present invention to provide a rotary cutter shroud for a disc cutterbar that enhances cutterbar performance in all crop conditions.

It is a still further object of the present invention to a disc shroud and floor shield for use on a rotary disc cutterbar in a mower-conditioner that is durable in construction, inexpensive of manufacture, carefree of maintenance, easily assembled, and simple and effective to use.

These and other objects are achieved according to the instant invention by providing a shroud for the rearward periphery of the cutter knives on a rotary disc cutterbar that creates a floor surface slightly above and adjacent to the rotating plane of the knives thereby reducing the tendency for cut crop material to fall into contact with the knives along the rearward periphery of the cutter knives.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right," "up" or "down," or "top" or "bottom" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
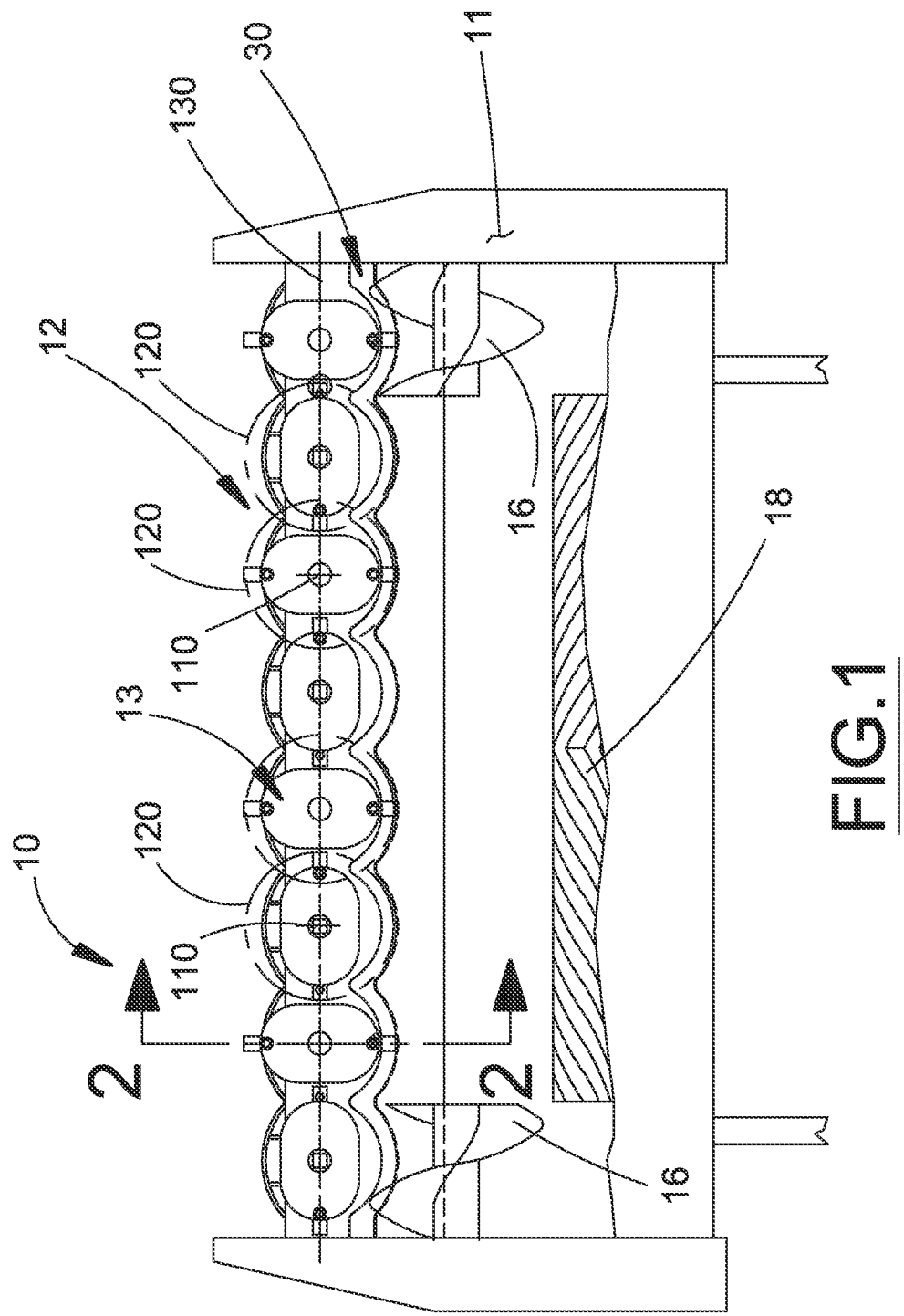
FIG. 1 is a partial perspective view of a typical cutter head for a harvesting machine of the type on which the present invention is useful.

Referring first to FIG. 1, a portion of crop harvesting machine header 10 such as is commonly employed on a mower-conditioner, or other crop harvester customarily used to harvest a standing crop such as hay, can be seen. This configuration of crop harvesting header 10 includes support frame 11 that may either be attached to and supported by a prime-mover, suspendingly connected to a prime-mover, or wheel-supported for towing by a prime-mover as is well-known in the art. The header further includes a disc cutterbar 12 supported by the frame generally transverse to a forward direction of travel operable to sever standing crop material with a rotary impact action as the machine is propelled through the standing crop, as is well known in the art. The disc cutterbar 12 includes a plurality of disc cutter modules 13 each having one or more knives 14 connected thereto for rotation in a generally horizontal cutting plane 100 defining a plurality of partially overlapping circular cutting peripheries 120 each centered on an upstanding cutterhead rotational axis 110. It is known for the cutting plane to be angled slightly from the horizontal (parallel to the ground surface) to improve crop cutting performance. Such angular deflections are considered to fall within the meaning of upstanding rotational axis as used herein. The cutter modules 13 are arranged in a transversely spaced configuration to define the cutting width of the disc cutterbar 12. Crop cutting generally occurs forward of a transverse axis 130 of the cutterbar as the knives 14 sweep through the forward portion of their cutting peripheries 120 ahead of a transverse axis 130. It is preferred to minimize interaction of the previously severed crop material with the knives as they sweep around the rearward portion of the cutterbar aft of the transverse axis 130.

Depending upon the overall width of the cutterbar 12, a crop converging apparatus 16 adjacent to the outboard ends of the cutterbar 12 may be provided to direct cut crop material laterally inwardly to consolidate the cut crop material along a central longitudinal axis of the machine. The general operation and construction of disc cutterbars can be found in U.S. Pat. No. 5,996,323, issued on Dec. 7, 1999, to Campbell, et al, the descriptive portions of which are incorporated herein by reference.

The crop harvesting header may also include a crop conditioning mechanism 18 supported behind the cutterbar 12 and converging apparatus 16, if equipped. Some crop harvesting machines are not provided with a conditioning mechanism, in which case the cut crop material would be deposited on the ground after having been cut. The preferred conditioning mechanism is a pair of counter-rotating, intermeshing conditioning rolls positioned rearwardly from the cutterbar to receive the cut crop material which are well known in the art; however, other forms of conditioning devices, such as flail conditioners, could also be provided.

Figure 3:
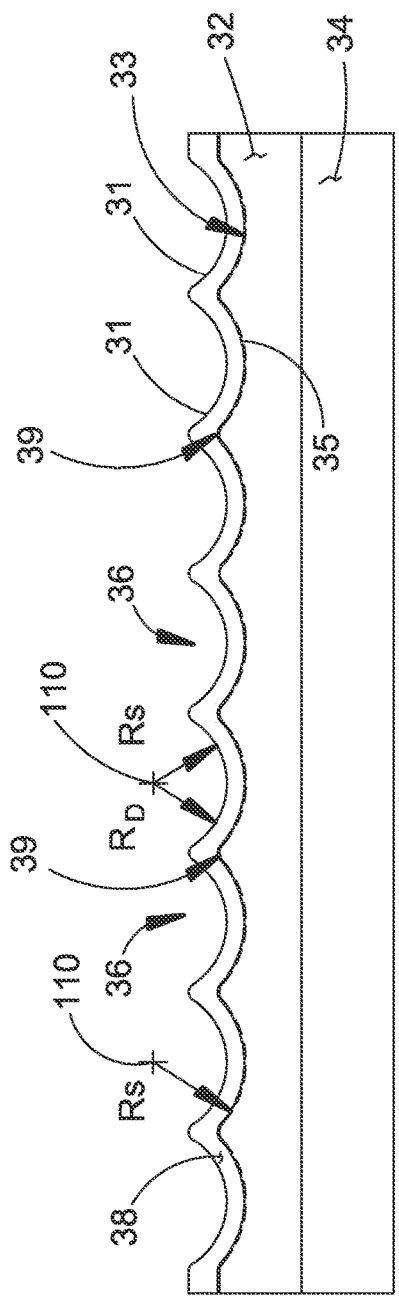
FIG. 3 is a plan view of one embodiment of the disc shroud embodying the present invention.
Figure 2:
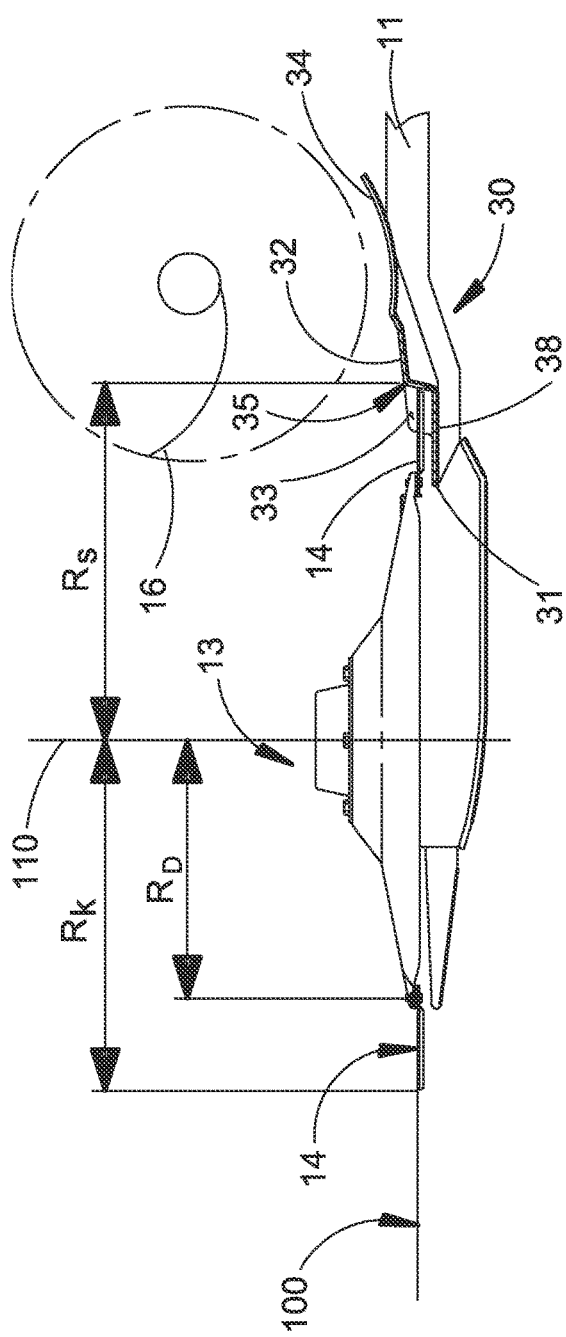
FIG. 2 section view of the segment shown in FIG. 1 taken along line 2-2.

Referring now to FIGS. 1 through 3, a disc shroud 30 in accordance with the present invention is provided along the rearward edge of the cutterbar to reduce re-cutting of previously cut crop material and improve crop flow from the cutterbar to the rearwardly positioned converging and/or conditioning mechanisms. The disc shroud 30 features a floor surface 32 arranged generally parallel to and slightly above the plane 100 of rotation of the knives 14. Generally parallel as used herein is not limited to parallel to the knife plane, but includes slight angling of the floor surface, typically upwardly away from the knife plane 100 so that severed crop will be directed upwardly from the knives as it progresses through the machine. The deflection away from parallel is not sufficient to impede the flow of severed crop material across the floor surface 32 rearwardly away from the cutterbar. The floor surface 32 extends laterally for a width generally matching that of the cutterbar 12. Floor surface 32 includes an upper forward end 35 having a plurality of arcuately contoured recesses 36 in the form of a circular segment, each contoured recess 36 having a radius $R_S$ extending into the floor surface 32 that is slightly greater than the outer radius $R_K$ of the path defined by the rotating knives 14 on the cutterheads 13 so that the upper forward end 35 is non-overlapping with the plurality of overlapping cutting peripheries 120. A generally upstanding wall 33 intersects the upper forward end 35 above and with lower catch surface 38 below to form a shroud around a rearward portion of the cutting periphery 120. The lower catch surface 38 extends generally forwardly from wall 33 in a plane that is slightly below the plane 100 of rotation of the knives 14 and at least as far radially inwardly toward each rotational axis 110 as the length of each knife, illustrated as disc radius $R_D$ in the figures. The leading edge 31 of the lower catch surface 38 may extend further toward the rotational axes 110 that the disc radius $R_D$, being limited only by interference the lower structure of each cutterhead module 13. Leading edge 31 may or may not be contoured to match the arcuate contours of the contoured edges 36 and upstanding wall 33. Intersections between the upstanding wall 33 and the floor 32 and lower catch surfaces 38 may be radiused to improve crop flow across the intersections.

The upstanding walls 33 following the contoured edges 36 of the disc shroud 30 are adjacent to only a rearward portion of the cutting periphery 120 of each disc cutterhead 13. The overlapping nature of the knife peripheries 120 (best shown in FIG. 1) determines the extent of the cutting periphery which is bounded by the disc shroud 30, generally on the order of one-quarter of the total cutting periphery of each disc.

In operation, a standing crop is severed from the ground as the machines moves in a forward operating direction. The crop severing occurs generally along the forward portion of the cutting periphery 120 ahead of the structure of the cutterbar 12 as the knives 14 rotate. The cut crop material, once severed from the ground, is directed generally upwardly and rearwardly, aided by forward movement of the machine through the standing crop, and over the cutterhead modules 13 in a mat of crop material. The disc shroud 30 and its floor surface 32, by being positioned above the rotating plane 100 of the knives, maintains the position of the crop mat generally above the knives on the rearward portion of their cutting periphery to minimize interaction between the crop mat and the knives thereby reducing secondary cutting of the crop. The floor surface 32 and upstanding wall 33 in the area between adjacent cutterheads (generally at apex 39) also prevents crop material from being thrown toward an adjacent cutterhead where it would be subjected to further re-cutting. As the objective of the harvesting machine is to sever the crop from the ground, process the crop, and capture the cut portion, maximum machine efficiency is realized when secondary crop cutting is minimized. Cutting the crop multiple times as it passes across the cutterbar increases the required input power to the cutterbar, loading and wear on the cutterbar drivetrain, and fuel consumption for the mowing operation. Multiple cuttings also increase crop wastage by creating material that is too small to collect and package. Smaller pieces of the cut crop are more likely to fall through the machine to the ground before it can be conditioned and converged into a windrow.

The portion of the floor surface 32 rearward beyond the extent of the cutting peripheries 120 is generally a solid surface that provides a lower boundary for cut crop material, keeping the crop material atop the surface 32 so that it may be directed toward a conditioning mechanism, if the machine is so equipped, or gathered into a discharge windrow. The relationship of the contoured edge 36 to the cutting peripheries 120 of the knives establishes the extent of the shrouding around the cutterheads. The height of the surface 32 above the plane 100 of the knives maintains the cut crop mat generally above the knives as the crop passes the rearward or trailing side of the cutterbar. While some of the crop material may interact with the knives on the trailing side of the cutterbar, the crop mat will be influenced in a mostly uniform manner by floor 32 and kept generally above the knives once the mat reaches the contoured edge 36 of the floor 32.

An extension floor 34 may be provided with additional surface contours configured to direct crop material into contact with the outboard converging apparatus 16 or the conditioning mechanism 18. The purpose of the extension floor 34, as well as the floor surface 32, is to maintain the flow of cut crop material above the surfaces 32, 34 and further minimize crop that falls to the ground before crop processing in the machine is completed.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A disc mower that cuts a standing crop by movement in a forward direction, the disc mower comprising:
   a support frame;

a cutterbar connected to the support frame and arranged on an axis that is transverse to the forward direction, the cutterbar having comprising:
  a plurality of rotary disc cutterheads, each disc cutterhead comprising at least one elongate knife having a proximal end and an opposite distal end, the proximal end being connected to the each disc cutterhead for rotation therewith about an upstanding rotational axis defining a cutting plane, the distal end describing a cutting periphery upon rotation of the each disc cutterhead, the plurality of rotary disc cutterheads spaced apart along the axis such that the cutting peripheries of the elongate knives of adjacent ones of the plurality of rotary disc cutterheads partially overlap; and
  a disc shroud connected to the support frame and disposed rearwardly adjacent to the cutterbar, the disc shroud shrouding the cutting peripheries of the elongate knives along the cutting planes of the elongate knives, the disc shroud comprising:
    a floor surface that is positioned above the cutting plane of each elongate knife to direct severed crop upwardly from the each elongate knife, support the severed crop above the cutting plane of each elongate knife, and mitigate re-cutting;
    a lower catch surface that is positioned below the cutting plane of each elongate knife; and, the disc shroud shrouding the cutting periphery along the cutting plane, the disc Ghroud connected to said support frame and disposed rearwardly adjacent to said cutterbar
    a wall positioned sufficiently close, in the direction of the cutting plane of each elongate knife, to the cutting peripheries of the elongate knives to prevent severed crop on the floor surface from approaching the elongate knives, thereby minimizing interaction between each elongate knife and the severed crop rearward from the axes of the elongate knives and reducing secondary crop cutting, the wall at least partially circumscribing the cutting peripheries of the elongate knives.

2. The disc mower of claim 1, further comprising a crop conditioning apparatus disposed rearwardly from the cutterbar, the disc shroud further comprising a rearward guide surface configured to receive and direct severed crop from the floor surface rearwardly toward the crop conditioning apparatus.

3. The disc mower of claim 2, further comprising a crop converging apparatus having first and second convergers intermediately longitudinally disposed between the cutterbar and the conditioning apparatus adjacent outboard ends of the cutterbar, the rearward guide surface being further configured to direct severed crop adjacent the outboard ends upwardly toward the crop converging apparatus.

4. The disc mower of claim 1, wherein the lower catch surface and the floor surface of the disc shroud form a generally continuous solid surface that supports the severed crop as it moves rearwardly from the cutterbar.

5. A disc mower that cuts a standing crop by movement in a forward direction, the disc mower comprising:
  a support frame;
  a cutterbar connected to the support frame and arranged on a cutterbar axis transverse to the forward direction of movement, the cutterbar further comprising:
    a plurality of rotary disc cutterheads spaced-apart along the cutterbar axis and axis, each disc cutterhead rotatable in a pre-determined direction about a generally upstanding axis, each disc cutterhead having comprising at least one elongate knife connected to the each disc cutterhead for rotation therewith to define a cutting plane, each elongate knife having an opposing free end that defines a cutting periphery during rotation, the plurality of rotary disc cutterheads spaced apart along the cutterbar axis transverse to a direction of forward movement such that the cutting peripheries of the elongate knives of adjacent ones of the plurality of rotary disc cutterheads partially overlap for severing crop; and
  a disc shroud comprising:
    a floor surface located above the cutting plane of each elongate knife to direct severed crop upwardly from the each elongate knife, support the severed crop above the cutting plane of the each elongate knife, and reduce or eliminate re-cutting of the severed crop;
    a lower catch surface connected to the floor surface to configure the disc shroud about the plurality of rotary disc cutterheads, the lower catch surface positioned below the cutting plane of each elongate knife and positioned rearwardly adjacent to the cutterbar; and
    a wall positioned sufficiently close, in the direction of the cutting plane of each elongate knife, to the cutting peripheries of the elongate knives to prevent severed crop on the floor surface from approaching the elongate knives, thereby minimizing interaction between each elongate knife and the severed crop rearward from the axes of the elongate knives and reducing secondary crop cutting, the wall at least partially circumscribing the cutting peripheries of the elongate knives.

6. The disc mower of claim 5, further comprising a crop conditioning apparatus disposed rearwardly from the cutterbar, the disc shroud further comprising a rearward guide surface to receive and direct the severed crop rearwardly toward the crop conditioning apparatus.

7. The disc mower of claim 6, further comprising a crop converging apparatus having first and second convergers intermediately longitudinally disposed between the cutterbar and the crop conditioning apparatus adjacent to outboard ends of the cutterbar, the rearward guide surface being further configured to direct severed crop that is adjacent the outboard ends upwardly toward the converging apparatus.

8. The disc mower of claim 5, wherein the lower catch surface and the floor surface of the disc shroud form a generally continuous solid surface for supporting the severed crop as it moves rearwardly from the cutterbar.

9. The disc mower of claim 5, wherein the disc shroud shrouds the cutting periphery of each elongate knife along the cutting plane of each elongate knife.

10. The disc mower of claim 5, wherein the floor surface and the lower catch surface are both generally parallel to the cutting plane of each elongate knife.

11. A disc mower that cuts a standing crop by movement in a forward direction, the disc mower comprising:
  a support frame;
  a cutterbar connected to the support frame and arranged on an axis that is transverse to the forward direction, the cutterbar comprising:
    a plurality of rotary disc cutterheads, each disc cutterhead comprising at least one elongate knife having a proximal end and an opposite distal end, the proximal end being connected to the each disc cutterhead for rotation therewith about an upstanding rotational axis defining a cutting plane, the distal end describing a cutting periphery upon rotation of the each disc cutterhead, the plurality of rotary disc cutterheads spaced apart along the axis such that the cutting peripheries for of the elongate knives of adjacent ones of the plurality of rotary disc cutterheads partially overlap; and a disc shroud comprising:
   a floor surface that is positioned above the cutting plane of each elongate knife to direct severed crop upwardly from the each elongate knife, support the severed crop above the cutting plane of the each elongate knife, and mitigate re-cutting,
   a lower catch surface that is positioned below the cutting plane of each elongate knife, and
   a wall positioned sufficiently close, in the direction of the cutting plane of each elongate knife, to the cutting peripheries of the elongate knives to prevent severed crop on the floor surface from approaching the elongate knives, thereby minimizing interaction between each elongate knife and the severed crop rearward from the axes of the elongate knives and reducing secondary crop cutting, the wall extending between the floor surface and the lower catch surface, and at least partially circumscribing the cutting peripheries of the elongate knives and radially spaced from the cutting peripheries of the elongate knives, wherein the disc shroud is connected to the support frame and disposed rearwardly adjacent to the cutterbar.

12. The disc mower of claim 1, wherein the wall is continuously formed with both the floor surface and the lower catch surface so as to transition therebetween.

13. The disc mower of claim 1, wherein the floor surface is positioned entirely above the cutting plane of each elongate knife and the lower catch surface is positioned entirely below the cutting plane of each elongate knife.

14. The disc mower of claim 1, wherein the lower catch surface extends completely inside the cutting periphery of each elongate knife.

15. The disc mower of claim 11, wherein the disc shroud shrouds the cutting periphery of each elongate knife along the cutting plane of each elongate knife.

16. The disc mower of claim 11, wherein the wall is continuously formed with both the floor surface and the lower catch surface.

17. The disc mower of claim 11, wherein the disc shroud further comprises an extension floor positioned behind the floor surface, wherein the extension floor is contoured differently from the floor surface.

* * * * *